(12) United States Patent
Jeung

(10) Patent No.: US 7,795,827 B2
(45) Date of Patent: Sep. 14, 2010

(54) CONTROL SYSTEM FOR CONTROLLING MOTORS FOR HEATING, VENTILATION AND AIR CONDITIONING OR PUMP

(76) Inventor: Young-Chun Jeung, 9718 Walker Ct., Cypress, CA (US) 90630

( * ) Notice: Subject to any disclaimer, the term of this patent is extended or adjusted under 35 U.S.C. 154(b) by 263 days.

(21) Appl. No.: 12/041,580

(22) Filed: Mar. 3, 2008

(65) Prior Publication Data

US 2009/0218968 A1 Sep. 3, 2009

(51) Int. Cl.
*H02P 6/08* (2006.01)
*H02P 6/16* (2006.01)
*H02P 7/29* (2006.01)

(52) U.S. Cl. .............................. 318/400.04; 318/400.16; 318/400.17; 388/811; 235/454; 235/462.48

(58) Field of Classification Search .................. 318/471, 318/652, 400.04, 400.16, 400.17; 388/811; 235/454, 462.48
See application file for complete search history.

(56) References Cited

U.S. PATENT DOCUMENTS

| | | | |
|---|---|---|---|
| 3,299,335 | A | 1/1967 | Wessels |
| 4,271,385 | A | 6/1981 | Azusawa |
| 4,389,606 | A | 6/1983 | Detering |
| 4,774,448 | A | 9/1988 | Yoshitomi |
| 4,888,530 | A | 12/1989 | Radik et al. |
| 5,243,732 | A | 9/1993 | Koharagi et al. |
| 5,492,273 | A | 2/1996 | Shah |
| 5,559,407 | A | 9/1996 | Dudley et al. |

(Continued)

FOREIGN PATENT DOCUMENTS

FR 2 896 638 A 7/2007

(Continued)

*Primary Examiner*—Paul Ip
(74) *Attorney, Agent, or Firm*—Knobbe Martens Olson & Bear, LLP

(57) ABSTRACT

The present invention discloses a control system for controlling a motor for a heating, ventilation and air conditioning (HVAC) or a pump comprising: an opto-isolated speed command signal processing interface into which a signal for controlling a speed of the motor is inputted and which outputs an output signal for controlling the speed of the motor being transformed as having a specific single frequency; a communication device into which a plurality of operation control commands of the motor; an opto-isolated interface for isolating the plurality of operation control commands inputted through the communication device and the transformed output signal for controlling the speed of the motor, respectively; a microprocessor, being connected to the opto-isolated interface, for outputting an output signal for controlling an operation of the motor depending on the plurality of operation control commands and the transformed output signal for controlling the speed of the motor; a sensor, being connected to the motor, for outputting a rotor position sensing signal of the motor; a logic control circuit, being connected to the opto-isolated interface, the microprocessor, and the sensor, respectively, for adding the rotor position sensing signal and the output signal for controlling the operation of the motor; a power switch circuit being connected to feed electric power to the motor; a gate drive circuit, being connected to the logic control circuit and the power switch circuit, respectively, for driving the power switch circuit; and a power supply device being connected to the logic control circuit, the power switch circuit, and the gate drive circuit, respectively, for feeding electric power thereto.

13 Claims, 7 Drawing Sheets

U.S. PATENT DOCUMENTS

| | | | |
|---|---|---|---|
| 5,663,616 A | 9/1997 | Stringfellow et al. | |
| 5,680,021 A | 10/1997 | Hollenbeck | |
| 5,739,614 A | 4/1998 | Suzuki et al. | |
| 5,767,635 A | 6/1998 | Steffens et al. | |
| 6,209,622 B1 | 4/2001 | Lagace et al. | |
| 6,310,452 B1 * | 10/2001 | Deck et al. | 318/273 |
| 6,369,536 B2 | 4/2002 | Beifus et al. | |
| RE38,406 E | 1/2004 | Faris et al. | |
| 6,801,013 B2 | 10/2004 | Woodward et al. | |
| 6,864,657 B1 | 3/2005 | Lungu | |
| 6,924,611 B1 | 8/2005 | Tzeng et al. | |
| 6,952,088 B2 | 10/2005 | Woodward et al. | |
| 7,015,663 B1 | 3/2006 | Tzeng et al. | |
| 7,042,180 B2 * | 5/2006 | Terry et al. | 318/400.21 |
| 7,131,398 B2 | 11/2006 | Cohen et al. | |
| 7,268,505 B2 * | 9/2007 | Pant et al. | 318/400.01 |
| 7,272,302 B2 | 9/2007 | Woodward et al. | |
| 7,296,753 B1 * | 11/2007 | Zucker | 235/462.48 |
| 7,327,118 B2 * | 2/2008 | Pant et al. | 318/807 |
| 7,378,821 B2 * | 5/2008 | Simpson, III | 323/205 |
| 7,443,119 B2 | 10/2008 | Liu | |
| 7,458,228 B2 | 12/2008 | Legrace et al. | |
| 7,590,334 B2 | 9/2009 | Yabusaki et al. | |
| 7,657,161 B2 | 2/2010 | Jeung | |
| 2002/0047348 A1 | 4/2002 | Ohiwa et al. | |
| 2003/0001442 A1 | 1/2003 | Hsu | |
| 2003/0080772 A1 * | 5/2003 | Giacomini et al. | 324/771 |
| 2003/0173924 A1 | 9/2003 | Blase et al. | |
| 2004/0232871 A1 * | 11/2004 | Deck et al. | 318/652 |
| 2005/0029976 A1 * | 2/2005 | Terry et al. | 318/439 |
| 2005/0162108 A1 * | 7/2005 | Pant et al. | 318/254 |
| 2005/0253744 A1 * | 11/2005 | Kern | 341/110 |
| 2006/0244333 A1 | 11/2006 | Jeung | |
| 2006/0291820 A1 | 12/2006 | Kobayashi | |
| 2007/0024250 A1 * | 2/2007 | Simpson, III | 323/205 |
| 2007/0247091 A1 | 10/2007 | Maiocchi | |
| 2008/0084171 A1 | 4/2008 | Leehey et al. | |
| 2008/0313884 A1 | 12/2008 | Jeung | |
| 2008/0315691 A1 | 12/2008 | Jeung | |
| 2009/0039807 A1 | 2/2009 | Yabusaki et al. | |
| 2009/0039820 A1 | 2/2009 | Milano et al. | |
| 2009/0134823 A1 | 5/2009 | Jeung | |
| 2009/0134827 A1 | 5/2009 | Jeung | |
| 2009/0136220 A1 | 5/2009 | Jeung | |
| 2009/0136359 A1 | 5/2009 | Jeung | |
| 2009/0136360 A1 | 5/2009 | Jeung | |
| 2009/0137199 A1 | 5/2009 | Jeung | |
| 2009/0218971 A1 * | 9/2009 | Jeung | 318/400.17 |
| 2009/0224709 A1 * | 9/2009 | Jeung | 318/400.13 |
| 2009/0267549 A1 | 10/2009 | Kitagawa | |
| 2009/0284201 A1 | 11/2009 | Jeung | |
| 2009/0315494 A1 | 12/2009 | Jeung et al. | |
| 2009/0315496 A1 | 12/2009 | Jeung et al. | |
| 2009/0315497 A1 | 12/2009 | Jeung et al. | |
| 2009/0315498 A1 | 12/2009 | Jeung et al. | |
| 2010/0039055 A1 | 2/2010 | Jeung | |
| 2010/0039058 A1 | 2/2010 | Jeung | |

FOREIGN PATENT DOCUMENTS

| | | |
|---|---|---|
| JP | 03248248 B2 | 1/2002 |
| JP | 2004-023823 A | 1/2004 |
| JP | 2004-56887 A | 2/2004 |
| JP | 2004-304928 A | 10/2004 |
| JP | 2005-168241 | 5/2005 |
| KR | 10-2006-0115930 A | 11/2006 |
| KR | 10-0696854 B1 | 3/2007 |
| KR | 10-2008-0019807 | 3/2008 |
| WO | WO 2009/111503 | 9/2009 |
| WO | WO 2009/140419 | 11/2009 |
| WO | WO 2009/158359 | 12/2009 |

* cited by examiner (A) 2+3 PHASE COMBINED MOTOR (B) 2 PHASE MOTOR

CONTROL SYSTEM FOR CONTROLLING MOTORS FOR HEATING, VENTILATION AND AIR CONDITIONING OR PUMP

TECHNICAL FIELD

The present invention relates to a control system for controlling a heating, ventilation and air conditioning (hereinafter referred to "HVAC") or a pump. More specifically, the present invention relates to a control system for controlling a brushless motor (hereinafter referred to "BLM") which is used for controlling a blower or a fan of an HVAC to control air flow and conditioning, or for driving a pump to control the flow and movement of liquids or water.

BACKGROUND

Recently, a BLM for driving a blower or a fan for an HVAC, or a pump has been widely used. The use of a BLM is closely related to a residing environments and a daily life, including apartments, offices, or factories, etc. More specifically, a motor for a blower or a fan for an HVAC, or a pump has a significant amount of electric power consumption of a motor, which is equal from several times to several ten times compared to the amount thereof to be used in different fields such as, e.g., the field of industrial mechanical devices or machine tools, etc., in case that such motor is required to be operated continuously for typically at least several hours or more per day. Therefore, a motor for a blower or a fan for an HVAC, or a pump, which requires a long time or a continuous operation, needs a very large amount of energy consumption. Particularly, the electric power consumption required for driving a blower or a fan for an HVAC, or a pump takes a very large portion in a BLM. Further, the use of a BLM affects directly efficiency and performance of a driving system for an HVAC or a pump.

Accordingly, a motor having high-efficiency for saving energy has been required, and a development of an intelligent control system capable of controlling a motor having high-efficiency conveniently and stably has been required.

In the past, an AC induction motor with an inexpensive and simple structure has been mainly used as a motor having high-efficiency described above. There is a problem that causes an unnecessary over-speed operation and hence a significant loss of electric power, because this AC induction motor is difficult to control a speed necessarily required for providing an energy saving and convenient operation conditions. Meanwhile, the AC induction motor has used a separate inverter in order to solve this kind of problem. However, the use of a separate inverter causes a noise problem, and has a certain limit in providing a program suitable for various required operation conditions, in addition to a speed controlling, due to a low operation efficiency in terms of economic efficiency (an energy consumption amount compared to costs)

Further, motors for driving a fan using a BLM or an electrically commuted motor (hereinafter referred to "ECM") have recently been practiced. However, the motors for driving a fan using an ECM are designed to be used mainly as motors for driving simply a compact or low-capacity fan with 100 Watts or less, and thus have a limit in that they are not suitable for an HVAC designed for the use of a high-capacity housing or industrial purpose.

In the meanwhile, technologies relating to an apparatus and a method for controlling an ECM used for an HVAC with a housing and industrial purpose are disclosed in U.S. Pat. No. 5,592,058 (hereinafter referred to "'058 patent") allowed to William R. Archer, et al. and entitled "Control System and Methods for a Multi-parameter Electronically Commutated Motor." However, because the control system and methods for a multi-parameter electronically commutated motor disclosed in '058 patent use AC half waves as input signals for various system parameters, use a separate programmable memory for storing the various system parameters, and use separately a complicated circuit such as ASIC, which is used with being connected to a means for sensing a position of a rotor and a current control circuit, '058 patent has a problem in that an overall system and controlling processes are complicated.

Further, in the control system and methods for a multi-parameter electronically commutated motor disclosed in '058 patent, since a microprocessor controls an ECM depending on parameter signals pre-stored in the programmable memory, it is impossible to respond properly in real time when, for example, abnormal operation condition may occur.

Still further, in the control system and methods for a multi-parameter electronically commutated motor disclosed in '058 patent, the means for sensing a position of a rotor may be made in a sensor less manner. However, in case of sensing a position of a rotor using this sensor less manner, there are problems that an unstable transient phenomenon may occur at a start-up of the ECM and a high possibility of a mal-operation may occur due to a vulnerability to an electromagnetic noise.

In the meanwhile, conventional control systems of a motor do not have means capable of controlling efficiently a system for driving various kinds of blowers or fans for an HVAC, or a pump, such as means or functions including a non-regulated speed control (NRS) operation function, a regulated speed control (RS) operation function, a constant torque control function, a constant air flow/constant liquid flow control function, a remote communication and monitoring function, a network control means or function capable of controlling a drive of multiple fans or pumps using a mod bus, and a data logging means or function capable of checking operation states or records of a control system for an HVAC or a pump.

Moreover, conventional control systems of a motor have a problem in that they cannot provide the functions described by a single integrated control circuit and program.

DETAILED DESCRIPTION

Technical Problem

Figure 1:
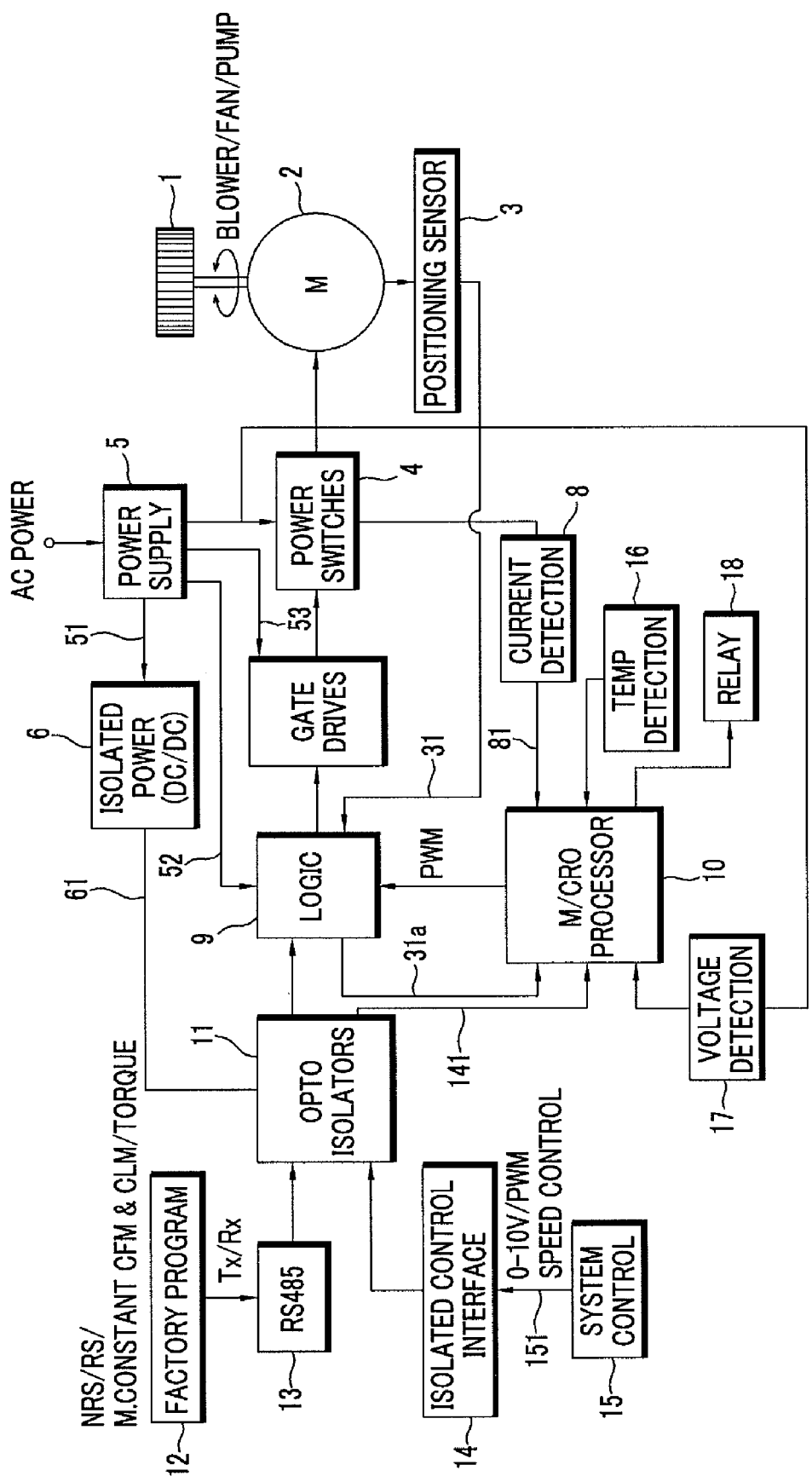
FIG. 1 is a block diagram of a control system for controlling a brushless motor according to one embodiment of the present invention.

The present invention is designed to solve the prior art problems described above and to provide a control system for controlling a motor for an HVAC or a pump, where a microprocessor receives multiple control signals for controlling a motor for an HVAC or a pump and control them in real time.

Further, the present invention is to provide a control system for controlling a motor for an HVAC or a pump, which is capable of sensing abrupt load variation of a motor and thus procuring stability and capable of protecting the motor and the control system from a change of an environmental temperature or an abnormal temperature change of the motor itself.

Further, the present invention is to provide a control system for controlling a motor for an HVAC or a pump, which has a built-in isolated power supply to be used for a control system for controlling external inputs and thus is capable of accessing easily various control command signals relating to a master control system of the motor for an HVAC or a pump, even without a separate external power supply source.

Further, the present invention is to provide a control system for controlling a motor for an HVAC or a pump having an opto-isolated communication means capable of transmitting and receiving various control program data and a means where a DC voltage signal (Vdc) or a pulse modulation signal to be used as a control signal for controlling a speed of the motor can be inputted therein through one input port and processed accordingly.

Technical Solution

According to the present invention, the present invention provides a control system for controlling a motor for a heating, ventilation and air conditioning (HVAC) or a pump comprising: an opto-isolated speed command signal processing interface into which a signal for controlling a speed of the motor is inputted and which outputs an output signal for controlling the speed of the motor being transformed as having a specific single frequency; a communication device into which a plurality of operation control commands of the motor; an opto-isolated interface for isolating the plurality of operation control commands inputted through the communication device and the transformed output signal for controlling the speed of the motor, respectively; a microprocessor, being connected to the opto-isolated interface, for outputting an output signal for controlling an operation of the motor depending on the plurality of operation control commands and the transformed output signal for controlling the speed of the motor; a sensor, being connected to the motor, for outputting a rotor position sensing signal of the motor; a logic control circuit, being connected to the opto-isolated interface, the microprocessor, and the sensor, respectively, for adding the rotor position sensing signal and the output signal for controlling the operation of the motor; a power switch circuit being connected to feed electric power to the motor; a gate drive circuit, being connected to the logic control circuit and the power switch circuit, respectively, for driving the power switch circuit; and a power supply device being connected to the logic control circuit, the power switch circuit, and the gate drive circuit, respectively, for feeding electric power thereto.

Advantageous Effect

The present invention has the following advantages:

1. Various operation controls required in a motor for an HVAC or a pump may be made in real time.

2. Operation efficiency of a motor a motor for an HVAC or a pump is significantly enhanced so that it is possible to operate a motor at low consumption of electric power and in a various and intelligent manner.

3. A control system of a motor for an HVAC or a pump according to the present invention may be embodied with a simple configuration.

4. It is convenient to use a control system of a motor for an HVAC or a pump according to the present invention, because a separate built-in power supply device for feeding an external power supply is included therein.

5. It is possible to monitor any troubles, operation efficiency, and a condition on a stable operation of an HVAC or a pump in real time, since various operation data information (e.g., operation current, voltage, speed, and temperature, etc. which are processed by a control system of a motor for an HVAC or a pump according to the present invention) is possible to be transmitted to an external system.

Further features and advantages of the present invention can be obviously understood with reference to the accompanying drawings where same or similar reference numerals indicate same components.

EMBODIMENTS OF THE PRESENT INVENTION

Hereinafter, the present invention is described in more detail with reference to the preferred embodiments of the present invention and appended drawings.

Figure 2A:
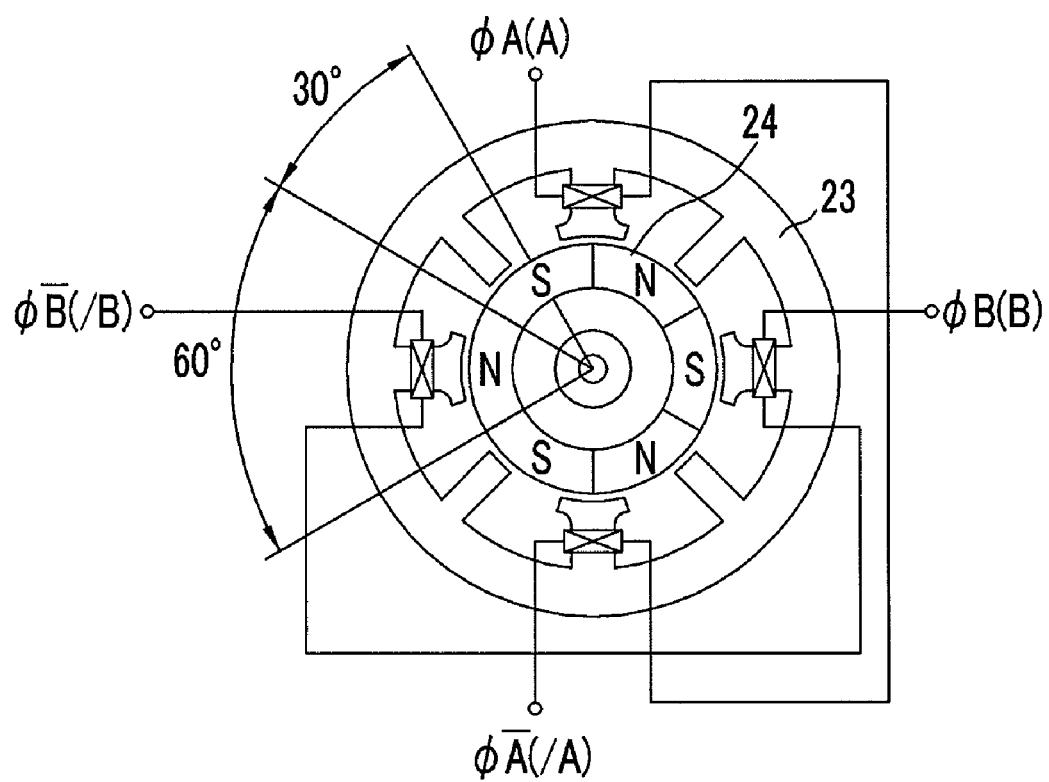
FIG. 2a is a cross-section view of a 2 phase and 3 phase combined type brushless motor being used in one embodiment of the present invention illustrated in FIG. 1.
Figure 2B:
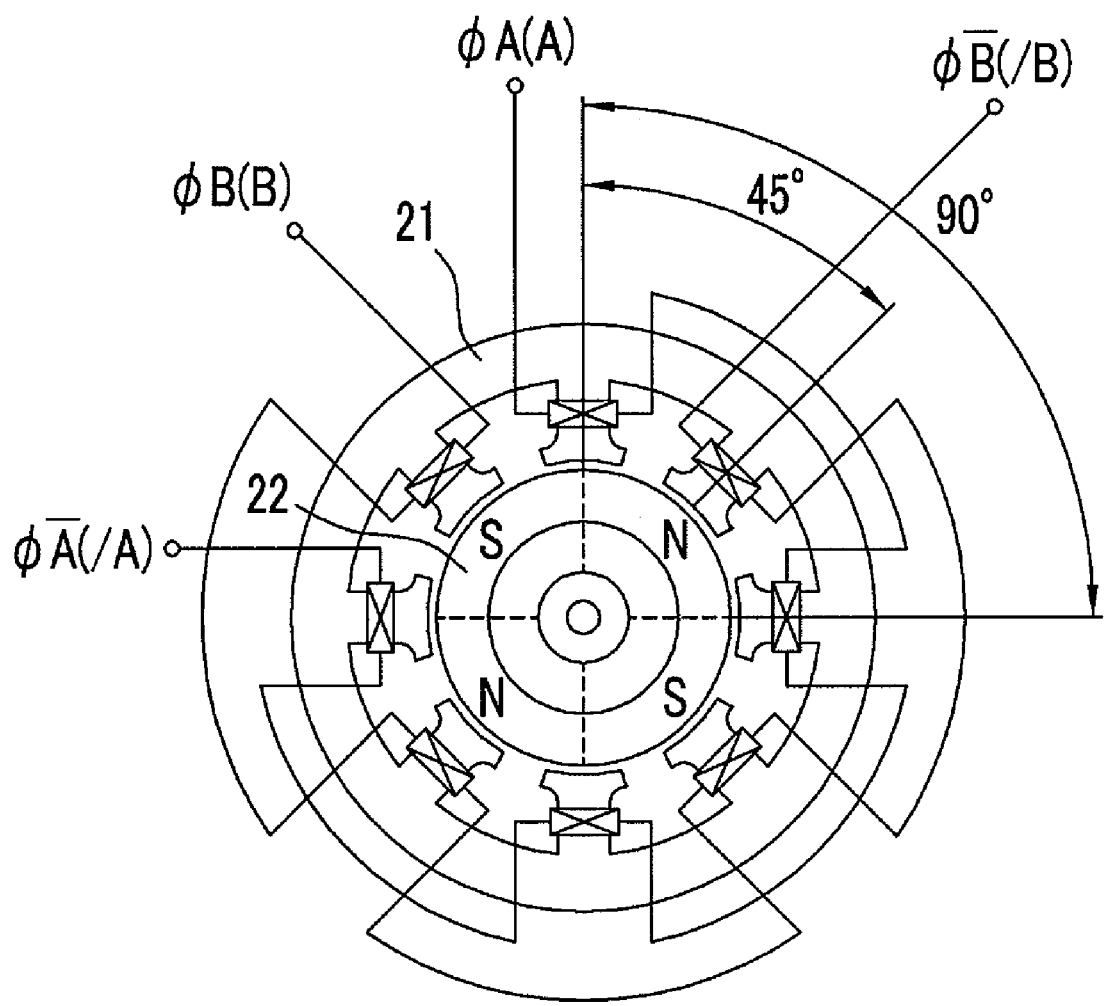
FIG. 2b is a cross-section view of a conventional 2 phase brushless motor being used in one embodiment of the present invention illustrated in FIG. 1.

FIG. 1 is a block diagram of a control system for controlling a brushless motor according to one embodiment of the present invention, FIG. 2a is a cross-section view of a 2 phase and 3 phase combined type brushless motor being used in one embodiment of the present invention illustrated in FIG. 1, and FIG. 2b is a cross-section view of a conventional 2 phase brushless motor being used in one embodiment of the present invention illustrated in FIG. 1.

Referring to FIG. 1, a 2 phase and 3 phase combined type brushless ECM illustrated in FIG. 2a or a conventional 2 phase brushless ECM illustrated in FIG. 2b may be used as a motor 2 to be controlled by a control system for an HVAC or a pump of the present invention. The 2 phase and 3 phase combined type brushless ECM illustrated in FIG. 2a is a motor where a 2 phase armature and a 3 phase rotor are combined. More specifically, a specific structure and operations of the 2 phase and 3 phase combined type brushless ECM illustrated in FIG. 2a is disclosed in more detail in Korean Patent No. 653434 (hereinafter referred to "'434 patent") registered on Jan. 27, 2006, entitled "Brushless DC motor," which was filed on Apr. 29, 2005 as Korean Patent Application No. 10-2005-0035861 by the present inventor and applicant. The disclosure of '434 patent is incorporated herein by reference. Because the main purpose of the present invention is to provide a control system for controlling the 2 phase and 3 phase combined type brushless ECM illustrated in FIG. 2a or the conventional 2 phase brushless ECM illustrated in FIG. 2b and the motors illustrated in FIGS. 2a and 2b are all known, the specific structures and operations of the 2 phase and 3 phase combined type brushless ECM illustrated in FIG. 2a and the conventional 2 phase brushless ECM illustrated in FIG. 2b will not be described in detail in the present specification. Moreover, although a control system according to the present invention is described to be applied to the conventional 2 phase and 3 phase combined type brushless ECM and 2 phase brushless ECM in an exemplary manner, a skilled person in the art may fully understand that a control system according to the present invention shall be used to control a single phase ECM or a typical ECM.

Referring back to FIG. 1, a motor 2 may be used for driving a blower or a fan used for an HVAC, or driving a pump (hereinafter "a blower or a fan" and "a pump" may be refereed to commonly as "a pump"). A control system for controlling a motor 2 for a pump 1 according to the present invention comprises an opto-isolated speed command signal processing interface 14 into which a signal for controlling a speed of the motor 2 is inputted and which outputs an output signal for controlling the speed of the motor 2 being transformed as having a specific single frequency; a communication device 13 into which a plurality of operation control commands of the motor 2; an opto-isolated interface 11 for isolating the plurality of operation control commands inputted through the communication device 13 and the transformed output signal for controlling the speed of the motor 2, respectively; a microprocessor 10, being connected to the opto-isolated interface 11, for outputting an output signal for controlling an operation of the motor 2 depending on the plurality of operation control commands and the transformed output signal for controlling the speed of the motor 2; a sensor 3, being connected to the motor 2, for outputting a rotor position sensing signal of the motor 2; a logic control circuit 9, being connected to the opto-isolated interface 11, the microprocessor 10, and the sensor 3, respectively, for adding the rotor position sensing signal and the output signal for controlling the operation of the motor 2; a power switch circuit 4 being connected to feed electric power to the motor 2; a gate drive circuit 7, being connected to the logic control circuit 9 and the power switch circuit 4, respectively, for driving the power switch circuit 4; and a power supply device 5 being connected to the logic control circuit 9, the power switch circuit 4, and the gate drive circuit 7, respectively, for feeding electric power thereto. Herein below, all elements and their cooperative relationships of a control system for controlling a motor 2 for a pump 1 according to the present invention will be described in more detail between the First, a control system for a pump 1 according to the present invention includes an opto-isolated speed command signal processing interface 14. The opto-isolated speed command signal processing interface 14 is connected to a central control system 15. Further, the an opto-isolated speed command signal processing interface 14 may have a separate built-in microprocessor (see reference numeral 146 illustrated in FIG. 5) which outputs a pulse width modulation (PWM) signal for controlling a speed being transformed to a specific single frequency (e.g., 80 Hz frequency according to one embodiment of the present invention) and maintained the transformed specific frequency. Therefore, the opto-isolated speed command signal processing interface 14 may process a control signal comprised of either a DC voltage signal (0-10 Vdc) 151 or a PWM signal 151 for controlling a speed of the motor 2, as well as a start-up signal and a stop signal, all of which are transmitted either from the central control system 15 or manually. Especially, even if the PWM signal 151 may have a large frequency variation width (40 Hz-120 Hz), the PWM signal 151 may feed a PWM output signal having a specific single frequency (e.g., a constant frequency of 80 Hz), regardless of the large frequency variation width (40 Hz-120 Hz). In this case, the opto-isolated speed command signal processing interface 14 may transform the PWM signal 151 for controlling a speed having a large frequency variation width (40 Hz-120 Hz) to a specific single frequency (e.g., 80 Hz according to one embodiment of the present invention) by using the separate microprocessor 146 (see FIG. 5). The opto-isolated speed command signal processing interface 14 is connected to the microprocessor 10 through the opto-isolated interface 11. Thus, the DC voltage signal (0-10 Vdc) 151 or the PWM signal 151 for controlling a speed of the motor 2 is fed to the microprocessor 10 as a PWM signal which is transformed to a specific single frequency (e.g., 80 Hz) by the opto-isolated speed command signal processing interface 14 (hereinafter referred to "a transformed output signal 151 for controlling a speed of the motor").

Further, a control system for a pump 1 according to the present invention includes a communication device such as RS485 13. RS485 13 is connected to a factory program device 12 including a pre-determined program which is programmable by a user. The factory program device 12 may be embodied, for example, by a personal computer (PC). The pre-determined program included in the factory program device 12 may be a program including at least one or more operation control commands consisting of a plurality of operation control commands relating to, for example, NRS, RS, constant torque, constant air flow/constant liquid flow, and a clockwise (CW) rotation/counter-clockwise (CCW) rotation of the motor 2. In an alternative embodiment, an operation control command relating to a CW/CCW rotation of the motor 2 may be inputted through RS485 13, for example, by a separate toggle switch.

Hereinbelow, specific details of functions and programs necessary for operating an HVAC and a pump according to the present invention will be described in more detail.

Referring to FIG. 1 again, an NRS control may be performed in an NRS firmware program mode which is pre-determined in the microprocessor 10. That is, when an NRS control command is inputted into the microprocessor 10 through the RS485 13 and the opto-isolated interface 11, from the factory program device 12 which is programmable by a user, the microprocessor 10 is switched to an NRS firmware program mode which is pre-determined in the microprocessor 10. In this NRS firmware program mode, the microprocessor 10 either transforms a PWM output signal to Low or zero (0), or modulates a pulse width of the PWM output signal increasingly or decreasingly at a constant rate, and the switched or modulated PWM output signal is transmitted to the 2 phase logic control circuit 9. This may result in that the motor 2 may stop or perform an NRS operation such as a simple speed-variable operation, etc.

A RS control may be performed in a NRS firmware program mode which is pre-determined in the microprocessor 10. That is, when a RS control command is inputted into the microprocessor 10 through the RS485 13 and the opto-isolated interface 11, from the factory program device 12 which is programmable by a user, the microprocessor 10 is switched to a RS firmware program mode which is pre-determined in the microprocessor 10. In this RS firmware program mode, the microprocessor 10 compares and calculates the transformed output signal 151 for controlling a speed of the motor being fed by the opto-isolated speed command signal processing interface 14 and an input signal 31a which is sensed by the sensor 3 for sensing a rotor position and is outputted through the 2 phase logic control circuit 9. Thereafter, the microprocessor 10 modulates a pulse width of the PWM output signal increasingly or decreasingly corresponding to a comparison and calculation result to maintain a constant speed which is commanded to the motor 2, and the modulated PWM output signal is transmitted to the 2 phase logic control circuit 9. Thus, it is possible that the motor 2 performs an RS operation which maintains a constant rotational speed, although a variance in DC voltage 54 fed from a power supply device 5 or a load variance of the pump 1 may occur.

A constant torque control may be performed in a constant torque firmware program mode which is pre-determined in the microprocessor 10. That is, when a constant torque control command is inputted into the microprocessor 10 through the RS485 13 and the opto-isolated interface 11, from the factory program device 12 which is programmable by a user, the microprocessor 10 is switched to a constant torque firmware program mode which is pre-determined in the microprocessor 10. In this constant torque firmware program mode, the microprocessor 10 modulates a pulse width of the PWM output signal increasingly or decreasingly to vary the speed of the motor 2 and the modulated PWM output signal is transmitted to the 2 phase logic control circuit 9. More specifically, the microprocessor 10 compares a pre-determined current value and a load current value 81 of the motor 2 being fed by a current detection circuit 8. Depending on the comparison result, the microprocessor 10 increases or decreases the pulse width of the PWM output signal for the load current value 81 of the motor 2 to maintain the pre-determined current value constantly. As a result, the speed of the motor increases until the motor 2 reaches at a constant torque value when the load current value 81 is decreased, while the speed of the motor decreases until the motor 2 reaches at a constant torque value when the load current value 81 is increased. In this manner, it is possible to perform a constant torque operation maintaining a constant torque.

A constant air flow/constant liquid flow control may be performed in a constant air flow/constant liquid flow control firmware program mode which is pre-determined in the microprocessor 10. That is, when a constant air flow/constant liquid flow control command is inputted into the microprocessor 10 through the RS485 13 and the opto-isolated interface 11, from the factory program device 12 which is programmable by a user, the microprocessor 10 is switched to a constant air flow/constant liquid flow firmware program mode which is pre-determined in the microprocessor 10. In this constant air flow/constant liquid flow firmware program mode, the microprocessor 10 modulates the PWM output signal calculated as a function value proportional to the speed and current of the motor 2 which is necessary for maintaining a constant air flow/constant liquid flow, depending on a condition determined by an input of the factory program device 12 regardless of the transformed output signal 151 for controlling a speed of the motor. The modulated PWM output signal is transmitted to the 2 phase logic control circuit 9 so that it is possible to perform a constant air flow/constant liquid flow operation. The technologies relating to performing a constant air flow/constant liquid flow operation control is disclosed in more detain in Korean Patent Application No. 10-2007-0122264, entitled "Apparatus to control a multi programmable constant air flow with speed controllable brushless motor," which was filed on Nov. 11, 2007 by the present applicant. The disclosure of Korean Patent Application No. 10-2007-0122264 is incorporated herein by reference.

Meanwhile, a control system for controlling the pump 1 according tot the present invention includes the microprocessor 10. A position signal 31 sensed from the sensor 3 for sensing a rotor position is inputted into the 2 phase logic control circuit 9, and then the 2 phase logic control circuit 9 outputs an input signal 31a of a rotational speed into the microprocessor 10. The microprocessor 10 may calculate an RPM of the motor 2 by using the input signal 31a of a rotational speed. The microprocessor 10 also receives a load current signal of the motor 2 through the power switching circuit 4 and the current detection circuit 8 and calculates a load current value of the motor 2. Further, the microprocessor 10 has a control program which makes the motor 2 to operate depending on a modulation rate of the transformed output signal 151 (typically, 80 Hz) for controlling a speed of the motor fed from the an opto-isolated speed command signal processing interface 14, in a manner that the motor 2 stops at the modulation rate of 0-5% and is operated with a varying speed at the modulation rate of 5-100%. For this purpose, the microprocessor 10 also outputs the PWM output signal (frequency: 20 KHz or more), which may vary the speed of the motor 2, to the phase logic control circuit 9. Further, the microprocessor 10 may receive a temperature signal of the motor 2 detected by a temperature detection sensor 16, and makes the motor 2 to stop the operation or decrease the speed thereof when the detected temperature becomes a constant temperature value or more. Further, the microprocessor 10 may receive a DC voltage 54 fed from the power supply device 5 and detected by a voltage detection circuit 17, and makes the motor 2 to stop the operation or makes a warning signal when the received DC voltage 54 becomes higher or lower than a pre-determined voltage value. Further, the microprocessor 10 may have a firmware program which may output a signal for driving a relay switch 18 to make a notice to an external user of an abnormal operation condition, in case that the microprocessor 10 decides the abnormal operation condition by determining an operation speed, current, voltage, and temperature, etc. of the motor 2, separately ort integrally.

Further, a control system for controlling the pump 1 according tot the present invention includes the 2 phase logic control circuit 9. The 2 phase logic control circuit 9 is connected to the gate drive circuit 7. The gate drive circuit 7 is connected to the power switch 4 and may drive the power switch 4. The power switch 4 is connected to the motor 2 and feeds the DC voltage 54 fed from the power supply device 5 to motor coils (ØA, ØB) (see FIG. 2) in a switching manner. The 2 phase logic control circuit 9 adds the rotor position sense signal 31 outputted from a Hall sensor 3 for sensing a position of the rotor and the PWM output signal having a frequency of 20 KHz or more fed from the microprocessor 10. The 2 phase logic control circuit 9 also has a logic switch circuit which may switch the motor coils ØA and ØB to maintain or switch the rotation direction of the motor 2 depending on a CW command signal or a CCW command signal being inputted through the opto-isolated interface 11 so that it is possible to switch the rotation direction of the motor 2.

Stile further, a control system for controlling the pump 1 according to the present invention includes the power supply device 5 which feeds electric power. The power supply device 5 rectifies an AC voltage inputted from outside and feeds the generated DC voltage 54 to the power switch circuit 4. The power supply device 5 also feeds a gate drive voltage 53 of DC 12-15V, which is dropped by a built-in DC-DC transforming device (not shown) in the power supply device 5, to the gate drive circuit 7. Further, the power supply device 5 feeds a voltage 52 of DC 12-15V to the 2 phase logic control circuit 9. In the meanwhile, a control system for controlling the pump 1 according to the present invention may include an isolated DC-DC power supply device 6 which is built in separately from the input of the AC voltage. A voltage of DC 12V outputted by the isolated DC-DC power supply device 6 is used as a power source for an external main system control 14 or a communication device such as RS485 through the opto-isolated interface 11. This built-in type isolated DC-DC power supply device 6 configures a separate power supply device which is electrically isolated from the power supply device 5 used for a control system for controlling the pump 1 according to the present invention. That is, because a built-in power supply device such as the isolated DC-DC power supply device 6 according to the present invention feeds separate electric power isolated from the power supply device 5 used for a control system for controlling the pump 1 according to the present invention, a separate external isolated power supply device to be used for accessing an electric signal of a external control device or system is not required.

Hereinbelow, various advantages will be described in more detail in case of using a control system for controlling the pump 1 according to the present invention that.

Equipment of the operation of an HVAC or a pump may be used in various indoor or outdoor environments and is generally required to be operated stably at a temperature approximately with a wide range of −40° C. to 60° C. Further, the motor 2 for an HVAC or a pump reaches at an over-heated condition, a system should not be stopped by switching the motor 2 to be operated a low speed in a safe mode before a break-down of the motor 2 occurs. In order to perform functions to satisfy the requirements described above, a control system according to the present invention includes the microprocessor 10 having a program with specific algorithms and the temperature detection sensor 16 connected to the microprocessor 10. The temperature value of the motor 2 detected by the temperature detection sensor 16 becomes a pre-determined stable temperature value or more, the microprocessor 10 reduces the rotation speed or the output of the motor 2 up to 40 to 50% at its maximum by using the program with specific algorithms. Further, when the temperature value of the motor 2 detected by the temperature detection sensor 16 returns to a normal temperature, the microprocessor 10 increases gradually the rotation speed or the output of the motor 2 to its original pre-determined speed or output by using the program with specific algorithms.

Further, in case of driving the pump 1, an abnormal condition may occur, including a condition that, for example, a pump circulator is clogged abruptly or a body part of a human being may be sucked into a pump inlet, etc., especially in a swimming pool. In such case, a very dangerous abnormal condition may result in such as a break-down of a pump, or damages to body or death. When such kind of an abnormal condition occurs, the speed of the motor 2 is reduced while the load current of the motor 2 increases abruptly, or the speed of the motor 2 is increased while the load current of the motor 2 decreases significantly. The microprocessor 10 used for a control system of the present invention receives a detection signal of the load current 81, the rotor position signal 31, the detected temperature signal of the motor 2 outputted from the temperature detection sensor 16, and the voltage variance detection signal of the DC voltage 54 outputted from the voltage detection circuit 17, and compares and calculates them and their corresponding pre-determined standard values or normal values. Thus, when the operation condition of the motor changes abruptly during a normal operation thereof (i.e., when an abnormal condition occurs), the microprocessor 10 feeds the variable PWM output signal to the 2 phase logic control circuit 9 depending on the compared and calculated values so that the microprocessor 10 may switch the motor 2 to stop or to be operated at a minimum operation output condition within a quick period of time.

Figure 3:
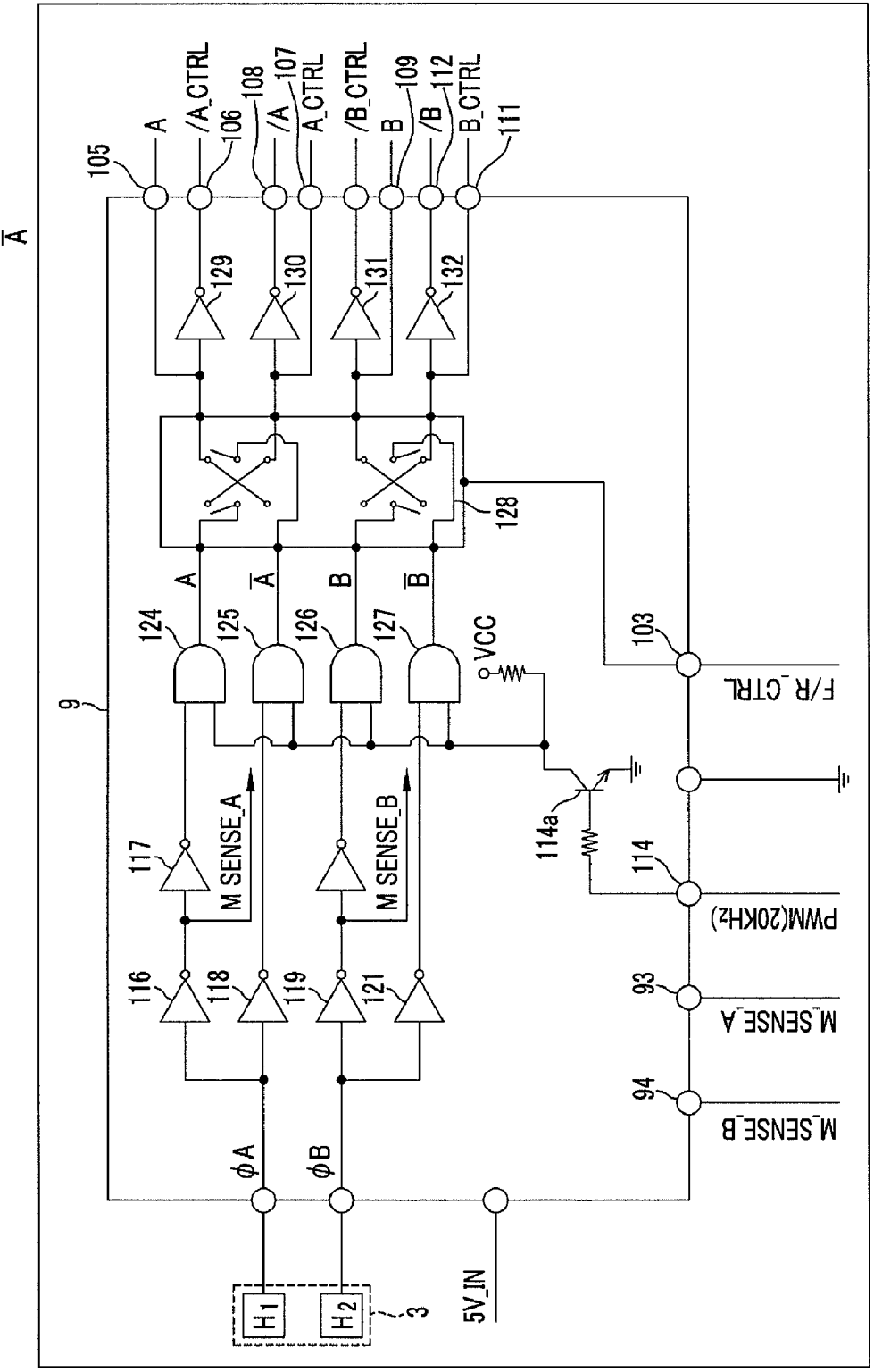
FIG. 3 is a view of a 2 phase logic control circuit being used in one embodiment of the present invention.

FIG. 3 is a view of a 2 phase logic control circuit being used in one embodiment of the present invention.

Referring to FIG. 3, the 2 phase logic control circuit 9 according tot the present invention is a position sensing sensor 3 comprised of two 2 phase Hall sensors (H1, H2) and receives ØA signal and ØB signal. The received ØA signal and ØB signal are transformed to a phase A signal and a phase/A signal, and a phase B signal and a phase/B signal, respectively, by a first group of NOT gates 116-121. The respective transformed phase signals (i.e., the phase A signal and the phase/A signal, and the phase B signal and the phase/B signal) are inputted into first input ports of AND gates 124-127. The PWM (20 KHz) signal 114 inputted from the microprocessor 10 through a collector of a transistor 114a is commonly inputted into second input ports of the AND gates 124-127. The outputs from the AND gates 124-127 are inputted into a four-row logic switch 128, and the outputs from the logic switch 128 are inputted into a second group of NOT gates 129-132. The inputs to the respective second group of NOT gates 129-132 become the outputs of the 2 phase logic control circuit 9 such as A, A_CTRL, B, and B_CTRL, and the outputs from the second group of NOT gates 129-132 become the outputs of the 2 phase logic control circuit 9 such as /A, /A_CTRL, /B, and /B_CTRL. Meanwhile, when a logic signal High (H) or Low (L) is inputted to a switch input port 103 of the logic switch 128 in the 2 phase logic control circuit 9, switch wirings in the logic switch 128 are changed and thus the phase A and the phase B are changed each other. The logic switch 128 is connected to the input (F/R_CTRL) port 103 which receives a signal for changing a rotational direction of the motor 2. Further, the 2 phase logic control circuit 9 has an output signal line M_SENSE_A and a port 93 for transmitting a signal of the Hall sensor 3 for the phase A and an output signal line M_SENSE_B and a port 94 for transmitting a signal of the Hall sensor 3 for the phase B, in order to obtain a rotor signal capable of calculating the speed of the motor 2. The 2 phase logic control circuit 9 as described above in detail may be used in a manner that the 2 phase logic control circuit 9 is connected to a 2 phase full bridge.

Figure 4:
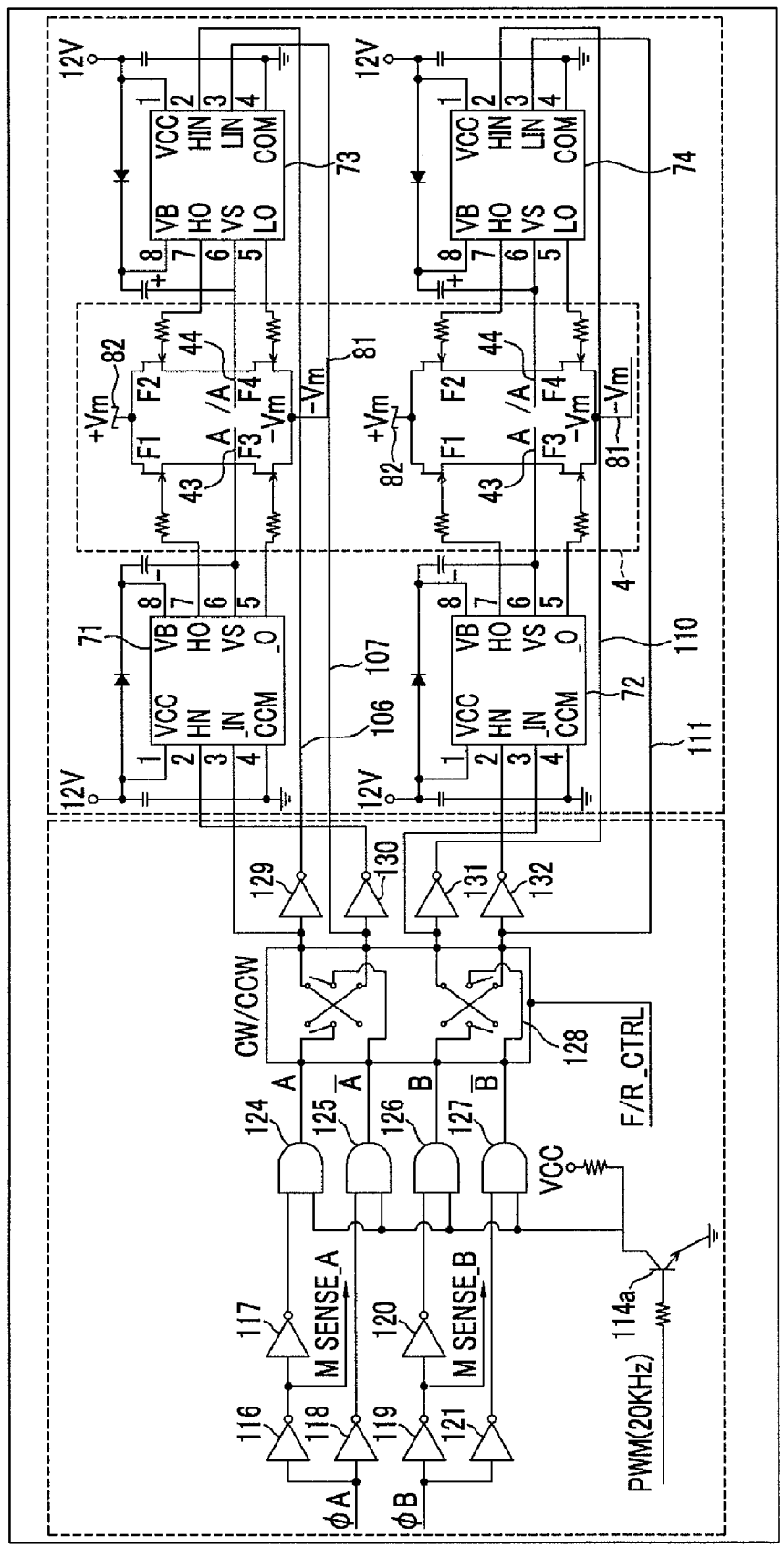
FIG. 4 is a detailed view of a power switch circuit being used in one embodiment of the present invention.

FIG. 4 is a detailed view of a power switch circuit being used in one embodiment of the present invention.

Referring to FIGS. 3 and 4, the outputs 105,106,107, and 108 of the 2 phase logic control circuit 9 are respectively connected to first gate-dedicated IC 71,73 for driving full bridge circuits F1,F2,F3, and F4 of phase A illustrated in FIG. 4, while the outputs 109,110,111, and 112 thereof are respectively connected to second gate-dedicated IC 72,74 for driving full bridge circuits F5,F6,F7, and F8 of phase B, which may be embodied by, e.g., IRS2106. Here, F represents a field effect transistor (FET). The outputs 105,106,107, and 108 of the 2 phase logic control circuit 9 switch the FETs (F1-F4) and the outputs 109,110,111, and 112 of the 2 phase logic control circuit 9 switch the FETs (F5-F8). The outputs 41,42 of phase A from the FETs (F1-F4) and the outputs 43,44 of phase B from the FETs (F5-F8) are fed to the armature windings of the motor 2, and drives the motor 2 which may be embodied by a conventional 2 phase and 3 phase combined type brushless ECM illustrated or a conventional 2 phase brushless ECM (see FIGS. 2a and 2b)

Figures 1, 5:
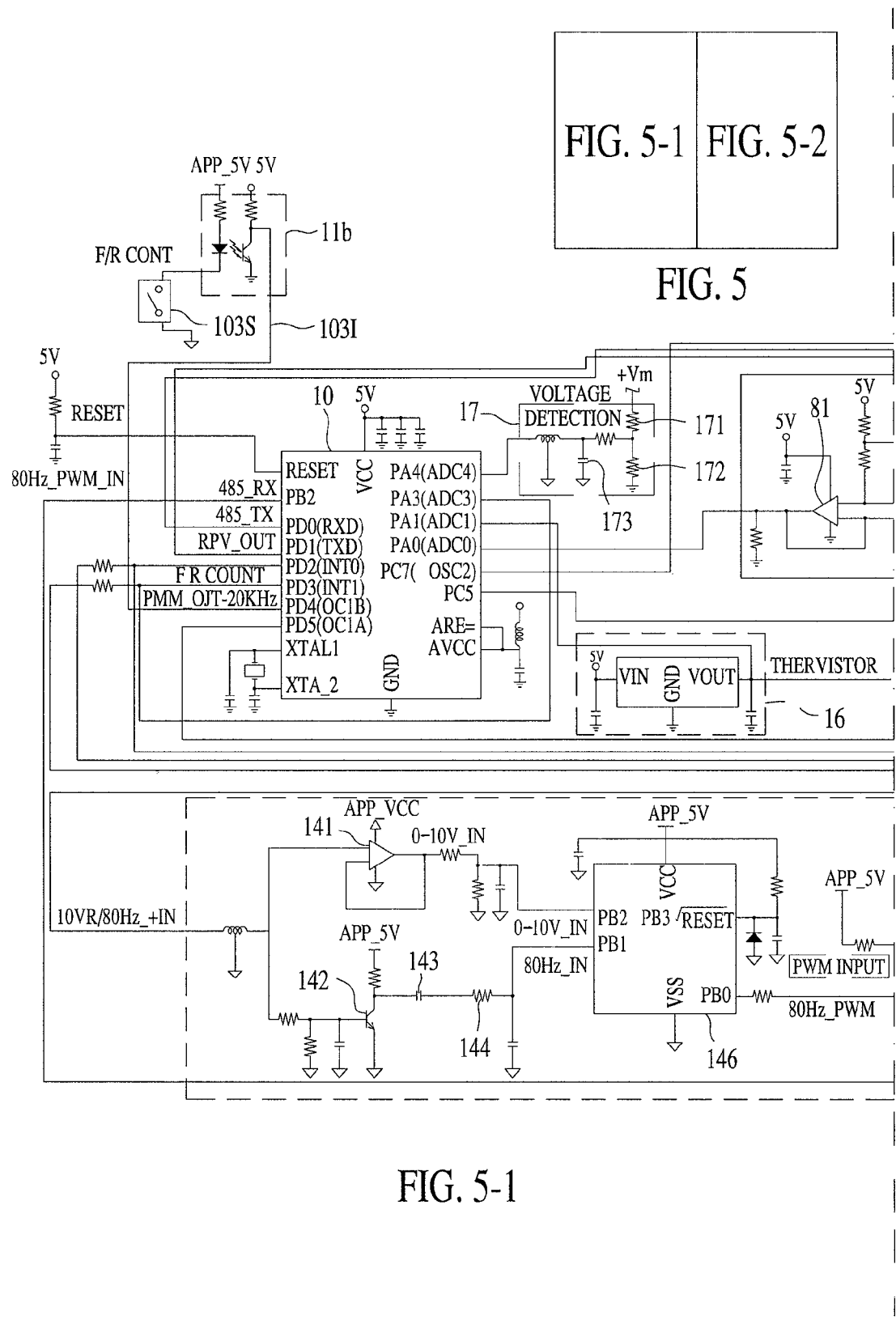
FIG. 5 is a detailed circuit view of a control system being used in one embodiment of the present invention.
Figures 2, 5:
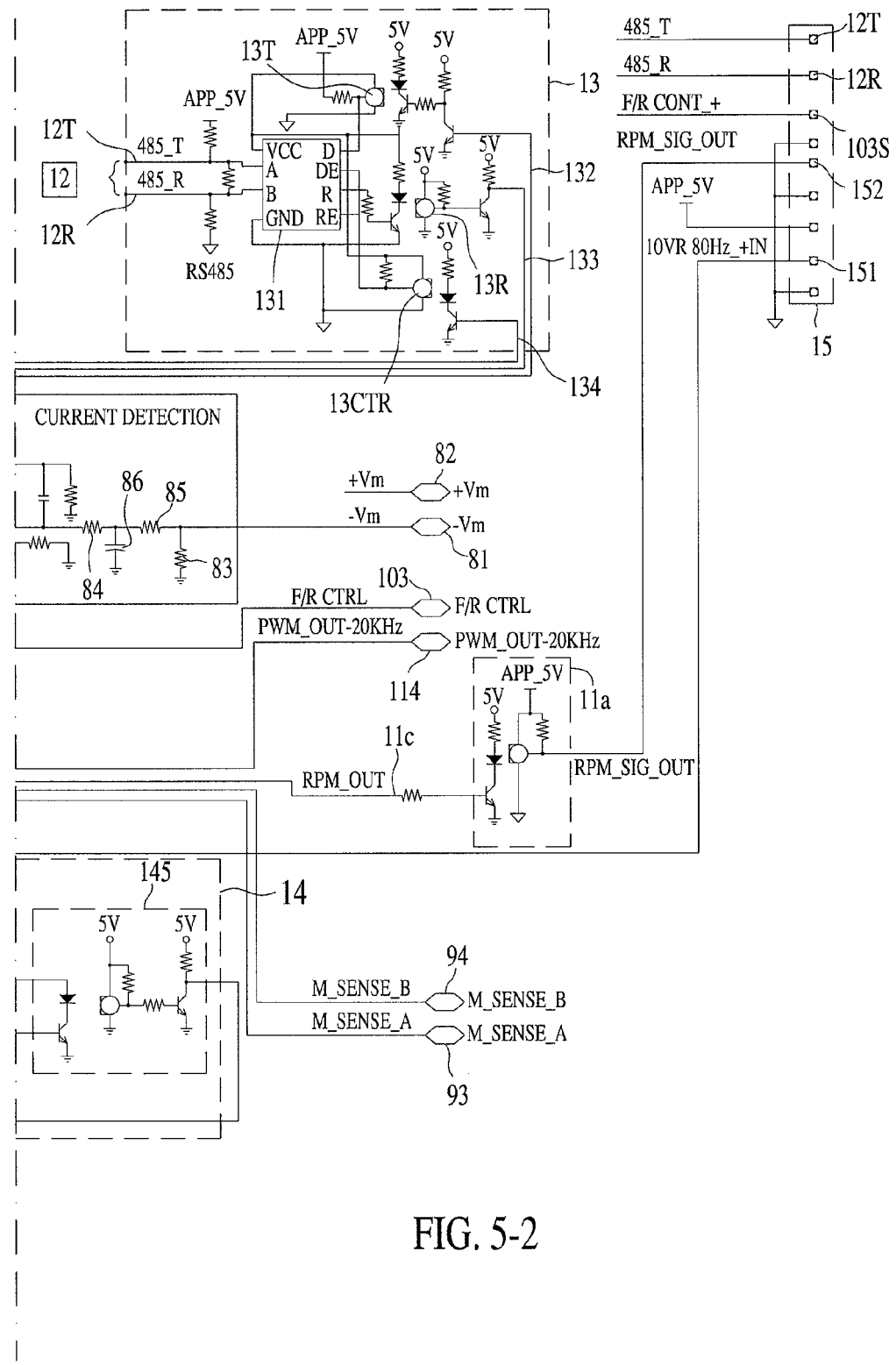

FIG. 5 is a detailed circuit view of a control system being used in one embodiment of the present invention.

Referring to FIGS. 1 and 5, pre-determined data of a plurality of operation control commands from the factory program device 12, where the pre-determined data are stored, are inputted into RS485 13 of the present invention. RS485 13 includes RS485 communication IC chip 131 having a transmitting line 12T and a receiving line 12R capable of communicating with the factory program device 12. The transmitting and receiving outputs of RS485 13 and the signal control (CTR) outputs are respectively inputted into the microprocessor 10 through opto-isolation couplers 13T, 13R, and 13CTR. A switch 103S is a means for changing a rotational direction of the motor 2 by a simple on-off operation and is connected to ground. A High (H) or Low (L) signal 103I by this switch 103S is inputted into the microprocessor 10 through an opto-isolation coupler 11b. The H or L signal 103I is inputted during an operation, the microprocessor 10 waits for a certain period of time until it identifies that the rotation of the motor 2 almost stops. Thereafter, the microprocessor 10 transmits a control signal for switching a rotational direction, as a switching input 103, to the 2 phase logic control circuit 9.

In the meantime, a DC voltage +Vm applied to the motor 2 is divided by resistance 171 and resistance 172 in the voltage detection circuit 17. A divided voltage is again smoothened by a condenser 173 and the smoothened voltage is inputted into the microprocessor 10. Resistance 83 is connected to between the power switch circuit 4 and ground voltage −Vm. A voltage across both ends of the resistance 83, which is proportional to a current value flowed in the power switch 4, passes through a integral filter circuits 84,85, and 86 and is inputted into a voltage comparison amplifier 81. The output of the voltage comparison amplifier 81 is inputted into the microprocessor 10 and then the microprocessor 10 calculates a load current value of the motor 2.

The temperature detection sensor 16, which may be embodied by a transistor or a thermistor for outputting a voltage signal proportional to a temperature, may be mounted on a case or an armature of the motor 2. The output signal of the temperature detection sensor 16 is inputted into the microprocessor 10, and the microprocessor 10 may transmit a signal for indicating an abnormal condition of the motor 2 to the relay switch 18. The relay switch 18 may be embodied by a switch where a contact point of a circuit is switched in an on-off manner. The microprocessor 10 also transmits a rotation speed data signal 11c of the motor 2 to a connection port 152 of the central control system 15 through the opto-isolation coupler 11a.

In the present invention, anyone of the DC voltage signal (0-10 Vdc) 151 or the PWM signal 151 for controlling the speed of the motor 2 from the central control system 15 is inputted into the opto-isolated speed command signal processing interface 14 through one port. In case that the DC voltage signal (0-10 Vdc) 151 for controlling the speed of the motor 2 is inputted, the DC voltage signal (0-10 Vdc) 151 for controlling the speed of the motor 2 is transmitted to an input PB2 of the microprocessor 10 through a linear amplifier 141. In case that the PWM signal 151 for controlling the speed of the motor 2 is inputted, the PWM signal 151 for controlling the speed of the motor 2 is outputted through a transistor 142 and then passes through a differential circuits 142,143, and 144, each of which is comprised of a condenser 143 and resistance 144, and then is transmitted to an input PB1 of a second microprocessor 146. Therefore, the opto-isolated speed command signal processing interface 14 of the present invention may process the DC voltage signal (0-10 Vdc) 151 and the PWM signal 151 for controlling the speed of the motor 2, respectively. For this purpose, the second microprocessor 146 includes a program having algorithms, which outputs a PWM output signal where a width of the PWM output signal with a specific frequency (e.g., 80 Hz) is exactly modulated in proportion to a rate (0-100%) of voltage with a range of 0 to 10 Vdc in case of the DC voltage signal (0-10 Vdc) 151 for controlling the speed of the motor 2, while outputs a PWM output signal where a width of the PWM output signal with a specific frequency (e.g., 80 Hz) is exactly modulated in proportion to a pulse width modulation rate (0-100%) in case of the PWM signal 151 for controlling the speed of the motor 2. The output of the second microprocessor 146 is connected to the input 80 Hz_PWM_IN of the microprocessor 10 through the opto-isolation coupler 145.

In the microprocessor 10 and the logic control circuit 9 being used in a control system of a motor for the pump 2 according to the present invention, not only various operations, which are required when controlling the motor 2, may be selected as described in detail above, but also data information relating to operation current, voltage, speed, and temperature which are processed by the microprocessor 10 is possible to be transmitted to an external system (e.g., a monitor, a personal computer, or a data recording device, etc.) through either RS485 13 connected to the microprocessor 10 or a separate communication device. As a result, logging the operation-related data information described above is available so that it is possible to monitor any troubles, operation efficiency, and a condition on a stable operation of an HVAC or a pump in real time by analyzing the operation conditions through 24 hours.

As various modifications could be made in the constructions and method herein described and illustrated without departing from the scope of the present invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A control system for controlling a motor for a heating system, ventilation and air conditioning (HVAC) system, or a pump, the control system comprising:
   an opto-isolated speed command signal processing interface into which a signal for controlling a speed of the motor is inputted and which outputs an output signal for controlling the speed of the motor, the output signal having a specific single frequency;
   a communication device into which a plurality of operation control commands of the motor are inputted;
   an opto-isolated interface for isolating the plurality of operation control commands inputted through the communication device and the output signal for controlling the speed of the motor, respectively;
   a microprocessor, being connected to the opto-isolated interface, for outputting an output signal for controlling an operation of the motor depending on the plurality of operation control commands and the output signal for controlling the speed of the motor;
   a sensor, being connected to the motor, for outputting a rotor position sensing signal of the motor;
   a logic control circuit, being connected to the opto-isolated interface, the microprocessor, and the sensor, respectively, for using the rotor position sensing signal and the output signal for controlling the operation of the motor;
   a power switch circuit being connected to feed electric power to the motor;
   a gate drive circuit, being connected to the logic control circuit and the power switch circuit, respectively, for driving the power switch circuit; and
   a power supply device being connected to the logic control circuit, the power switch circuit, and the gate drive circuit, respectively, for feeding electric power thereto.

2. The control system of claim 1 wherein the motor is anyone among a 2 phase and 3 phase combined type brushless electronically commutated motor (ECM) where a 2 phase armature and a 3 phase rotor are combined, a 2 phase brushless motor (BLM), a single phase brushless servo (BLS), or another ECM.

3. The control system of claim 2 wherein the control system further comprises a built-in isolation power supply device which is isolated from the power supply device and is used for a power source of an external system through the opto-isolation interface.

4. The control system of claim 1 wherein the sensor for outputting a rotor position sensing signal of the motor is embodied by a Hall sensor.

5. The control system of claim 1, wherein the plurality of operation control commands includes at least one or more of a non-regulated speed control (NRS) command, a regulated speed control (RS) command, a constant torque control command, a constant air flow/constant liquid flow control command, and a clockwise (CW) rotation/counter-clockwise (CCW) rotation control command of the motor.

6. The control system of claim 5 wherein the CW rotation/CCW rotation control command of the motor is inputted into the communication device by a separate on-off switch.

7. The control system of claim 1, wherein the signal for controlling a speed of the motor is a DC voltage signal or a pulse width modulation (PWM) signal, and wherein the opto-isolated speed command signal processing interface outputs the output signal for controlling the speed of the motor that has the specific single frequency either in proportion to a voltage rate of the DC voltage signal or in proportion to a pulse width modulation rate of the PWM signal.

8. The control system of claim 5, wherein the signal for controlling a speed of the motor is a DC voltage signal or a pulse width modulation (PWM) signal, and wherein the opto-isolated speed command signal processing interface outputs the output signal for controlling the speed of the motor that has the specific single frequency either in proportion to a voltage rate of the DC voltage signal or in proportion to a pulse width modulation rate of the PWM signal.

9. The control system of claim 6, wherein the signal for controlling a speed of the motor is a DC voltage signal or a pulse width modulation (PWM) signal, and wherein the opto-isolated speed command signal processing interface outputs the output signal for controlling the speed of the motor that has the specific single frequency either in proportion to a voltage rate of the DC voltage signal or in proportion to a pulse width modulation rate of the PWM signal.

10. The control system of claim 7, wherein the DC voltage signal is a signal having a range of 0-10 Vdc, wherein the PWM signal is a signal having a frequency range of 40-120Hz, wherein the specific single frequency is 80Hz, and wherein the output signal for controlling the operation of the motor is a PWM output signal having a frequency of 20KHz or more.

11. The control system of claim 1, wherein the control system for controlling the motor further comprises:
a current detection circuit for detecting a load current of the motor and feeding the detected load current to the microprocessor;
a temperature detection sensor for detecting a temperature of the motor and feeding the detected temperature to the microprocessor; and
a voltage detection circuit for detecting a voltage being fed from the power supply device to the power switch circuit and feeding the detected voltage to the microprocessor.

12. The control system of claim 11 wherein the control system for controlling the motor further comprises a relay switch into which an output for making a notice of an abnormal operation condition is fed from the microprocessor in the case that the motor is operated in the abnormal operation condition.

13. The control system of claim 11 wherein data information relating to operation current, voltage, speed, and temperature of the motor which are processed by the microprocessor is transmitted to an external system through either the communication device connected to the microprocessor or a separate communication device.

* * * * *